(No Model.)

J. T. DAVIS.
VEHICLE WHEEL.

No. 595,700. Patented Dec. 21, 1897.

Witnesses:
Albert Speiden
Relle Ellsoth

Inventor:
John T. Davis
by R. S. Dyrenforth
his attorney.

UNITED STATES PATENT OFFICE.

JOHN T. DAVIS, OF SAN FRANCISCO, CALIFORNIA, ASSIGNOR OF ONE-HALF TO CHARLES W. KOHLSAAT, OF NEW YORK, N. Y.

VEHICLE-WHEEL.

SPECIFICATION forming part of Letters Patent No. 595,700, dated December 21, 1897.

Application filed December 23, 1896. Serial No. 616,781. (No model.)

*To all whom it may concern:*

Be it known that I, JOHN T. DAVIS, a citizen of the United States, residing at San Francisco, in the county of San Francisco and State of California, have invented certain new and useful Improvements in Vehicle-Wheels; and I do hereby declare the following to be a full, clear, and exact description of the invention, such as will enable others skilled in the art to which it appertains to make and use the same.

This invention relates to vehicle-wheels.

The object is to produce a wheel in which all shocks and jars incident to contact with obstructions or the like will be taken up and distributed to the entire area of the wheel, thereby obviating the destructive racking to which a vehicle is subjected where the ordinary rigid-spoked wheels are employed and resulting in increased comfort to the occupant of a vehicle equipped with wheels of this character.

With this object in view the invention consists in the novel construction and combination of parts of a vehicle-wheel, as will be hereinafter fully described and claimed.

In the accompanying drawings, forming a part of this specification, and in which like letters of reference indicate corresponding parts, I have illustrated one form of embodiment of my invention, although it is to be understood that other forms of embodiment thereof may be employed without departing from the spirit of the same, and in these drawings—

Figure 1:
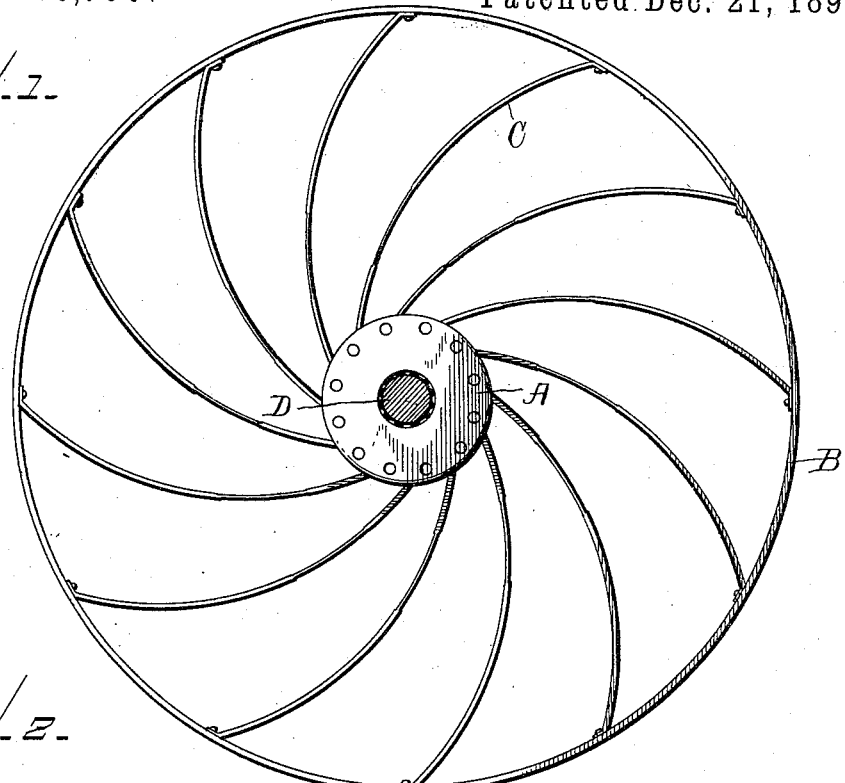
Figure 2:
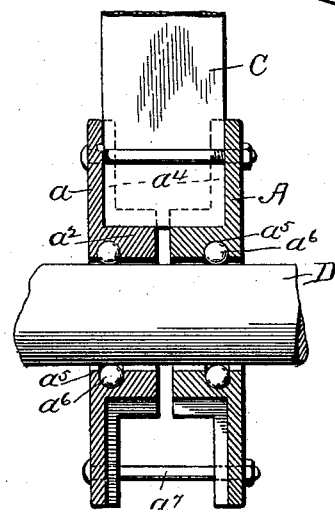
Figure 3:
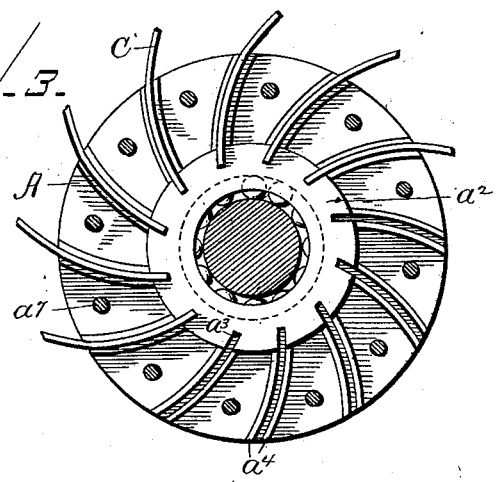

Figure 1 is a view in side elevation displaying a completed wheel. Fig. 2 is a transverse sectional view of the hub, on an enlarged scale, showing its peculiar construction. Fig. 3 is a similar view in elevation, showing more particularly the manner in which the spokes are held in place in the hub.

Referring to the drawings, A designates the hub; B, the tire or rim; C, the spring-metal spokes, and D the axle.

The hub is made in two sections, each of which is provided with a disk portion $a$ and a raised centrally-disposed boss $a^2$, having an opening for the axle. The boss is provided in its periphery with slots or recesses $a^3$, which are disposed in lines substantially tangential to the wall of the axle-opening and constitute, when the hub-sections are assembled, sockets or housings for the inner ends of the spokes, the same being held in position therein by means of the disposition of the recesses with relation to the axle-opening and also by frictional contact therewith. Each disk is also provided with means for holding and bracing the sides of the inner end portions of the spokes, comprising in this instance pairs of curved ribs or flanges $a^4$ in lateral alinement with the sockets $a^3$ and operating in conjunction therewith to hold the spokes firmly within the hub. It will be observed by reference to Fig. 1 that the radiation of the spokes with relation to the hub is such that they form volutes, by which arrangement there can never be any direct end thrust on the spokes, but the pressure or thrust will always be to one side of and at an oblique line to the axle. By this disposition of the spokes with relation to the axle I attain the highest possible resilient action of the spokes, as these will yield in the direction of the trend of the curve or volute as soon as an obstacle is struck. In order to increase the resiliency of the spokes and also to center or practically to confine the points of greatest give to a belt or zone adjacent to and concentric with the axle, I reduce the spokes from a point near the hub outward for about one-third of their length, so that upon impact with an object the reduced portion of each spoke will yield first, thereby removing practically all strain from the inner ends of the spokes and also from the axle. The inner wall of the axle-opening of each boss is provided in this instance with a circumferential groove or way $a^5$, in which are mounted balls $a^6$ to constitute ball-bearings.

As a means for holding the parts of the hub and the spokes assembled I employ in this instance bolts $a^7$, which pass through the disk portions $a$ between the spokes and may be secured in place by means of nuts or by upsetting their ends.

The rim B is shown in this instance as secured to the spokes by having the ends of the latter bent at an angle to their length to form toes or offsets, with a bolt or rivet passed through each toe and the rim; but it is to be understood that I do not limit myself to this particular kind of rim, as I may employ any other form that may be preferred and secure the spokes thereto or therein in various other ways.

Having thus fully described my invention, what I claim as new, and desire to secure by Letters Patent, is—

1. A vehicle-wheel having a hub provided with spoke-openings arranged or disposed in lines substantially tangential to the axle-opening, and spokes having their inner ends seated in the openings, and held in place therein by means of the peculiar disposition of the said openings, and by frictional contact with the walls thereof, substantially as described.

2. A vehicle-wheel having a hub provided with elastic spokes arranged or disposed in lines substantially tangential to the axle, the said spokes being reduced or weakened intermediate of their ends, substantially as described.

3. The combination, in a vehicle-wheel, of a hub, a rim, and elastic spokes connecting the hub and the rim, said spokes being reduced or weakened intermediate of their ends, substantially as described.

4. A vehicle-wheel having a hub provided with spoke-openings disposed in lines substantially tangential to the axle-opening, in combination with curved resilient spokes having their inner ends seated in the said openings, the said spokes being reduced or weakened intermediate of their ends, substantially as described.

5. A vehicle-wheel having a hub provided with spoke-openings disposed in lines substantially tangential to the axle-opening, and with ribs in lateral alinement with the openings, in combination with curved spokes having their inner ends seated in the said openings and the sides of these end portions held between the said ribs, the said spokes being reduced or weakened intermediate of their ends, substantially as described.

6. A vehicle-wheel having a hub provided with spoke-openings disposed in lines substantially tangential to the axle-opening, and with curved ribs in lateral alinement with the openings, in combination with volute-shaped spokes having their inner ends seated in the said openings with the sides of these end portions held between the said ribs, and their intermediate portions weakened and bolts or the like for holding the sections of the hub assembled, substantially as described.

7. A vehicle-wheel having a hub provided with spoke-openings disposed in lines substantially tangential to the axle-opening and with curved ribs in lateral alinement with the openings, and in its axle-opening with circumferential grooves or ways for ball-bearings, in combination with volute-shaped spokes having their inner end portions seated in the said openings, with the sides of these portions held between the said ribs, and having their intermediate portions weakened, bolts or the like for holding the parts of the hub assembled, and a rim secured to the outer ends of the spokes, substantially as described.

In testimony whereof I affix my signature in presence of two witnesses.

JOHN T. DAVIS.

Witnesses:
R. G. DYRENFORTH,
R. M. ELLIOTT.